United States Patent
Cao et al.

(10) Patent No.: US 12,038,288 B2
(45) Date of Patent: Jul. 16, 2024

(54) METHOD, COMPUTER PROGRAM, AND DEVICE FOR CONTROLLING A ROUTE

(71) Applicant: BAYERISCHE MOTOREN WERKE AKTIENGESELLSCHAFT, Munich (DE)

(72) Inventors: Yang Cao, Chicago, IL (US); Won Tchoi, Barrington, IL (US); Jilei Tian, Chicago, IL (US); Marko Werner, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 17/152,885

(22) Filed: Jan. 20, 2021

(65) Prior Publication Data
US 2022/0228875 A1  Jul. 21, 2022

(51) Int. Cl.
*G01C 21/34* (2006.01)

(52) U.S. Cl.
CPC ..... *G01C 21/3415* (2013.01); *G01C 21/3453* (2013.01)

(58) Field of Classification Search
CPC .............. G01C 21/343; G01C 21/3415; G01C 21/3453; G06Q 10/025; G06Q 10/047; G06Q 10/0631; G06Q 10/109; G06Q 30/0284; G06Q 50/30; G06Q 10/06312
See application file for complete search history.

(56) References Cited

U.S. PATENT DOCUMENTS

| | | | | |
|---|---|---|---|---|
| 6,317,686 | B1* | 11/2001 | Ran | G08G 1/0141 73/178 R |
| 8,744,734 | B2* | 6/2014 | Chiu | G01C 21/3492 455/457 |
| 10,324,463 | B1* | 6/2019 | Konrardy | G05D 1/0278 |
| 10,430,736 | B2* | 10/2019 | Chidlovskii | G06Q 50/30 |
| 10,731,990 | B2* | 8/2020 | Gawrilow | G01C 21/3453 |
| 11,235,774 | B2* | 2/2022 | Cheng | G06N 5/046 |
| 11,397,089 | B2* | 7/2022 | Nagy | G05D 1/021 |
| 2002/0016670 | A1* | 2/2002 | Powell | |
| 2008/0109156 | A1* | 5/2008 | Park | G01C 21/343 701/533 |
| 2009/0043486 | A1* | 2/2009 | Yang | G01C 21/3492 701/117 |

(Continued)

OTHER PUBLICATIONS

U.S. Appl. No. 16/937,610, filed Jul. 24, 2020, Tian, Jilei et al.

*Primary Examiner* — Steven B Theriault
(74) *Attorney, Agent, or Firm* — Kieran O'leary; 2SPL Patent Attorneys PartG mbB (57) ABSTRACT

Embodiments relate to a method, a computer program and a device for controlling a route connecting a plurality of destinations in a road network. The method for controlling a route connecting a plurality of destinations in a road network comprises receiving input information. The input information comprises information about a situation with impact on the route. Furthermore, the method comprises recalculating a plurality of travel times between the plurality of destinations of the route, based on the received input information and distances between the plurality of destinations. Also, the method comprises providing output information about the recalculation, which comprises information about a dynamic change of the route.

11 Claims, 5 Drawing Sheets

(56) References Cited

U.S. PATENT DOCUMENTS

| | | | | |
|---|---|---|---|---|
| 2011/0029231 A1* | 2/2011 | Mueller | ............ | G08G 1/096827 701/533 |
| 2011/0144898 A1* | 6/2011 | Konig | ............ | H04L 45/123 715/764 |
| 2011/0288765 A1* | 11/2011 | Conway | ............ | G08G 1/096816 701/533 |
| 2013/0317742 A1* | 11/2013 | Ulloa Paredes | ..... | G06Q 10/063 706/46 |
| 2013/0317884 A1* | 11/2013 | Chidlovskii | ............ | G06Q 10/025 705/7.31 |
| 2014/0035921 A1* | 2/2014 | Yeh | ............ | G08G 1/13 345/440 |
| 2014/0046585 A1* | 2/2014 | Morris, IV | ............ | G06Q 10/047 701/400 |
| 2014/0052374 A1* | 2/2014 | Hoch | ............ | G01C 21/343 701/533 |
| 2014/0089036 A1* | 3/2014 | Chidlovskii | ............ | G06Q 10/06 705/7.27 |
| 2015/0046083 A1* | 2/2015 | Maitra | ............ | G08G 1/123 701/465 |
| 2015/0204688 A1* | 7/2015 | Gearhart | ............ | G01C 21/3682 701/540 |
| 2015/0300835 A1* | 10/2015 | Fowe | ............ | G08G 1/012 701/410 |
| 2016/0210860 A1* | 7/2016 | Belzner | ............ | G08G 1/147 |
| 2017/0262790 A1* | 9/2017 | Khasis | ............ | G08G 1/012 |
| 2018/0211186 A1* | 7/2018 | Rakah | ............ | G06V 20/593 |
| 2019/0094030 A1* | 3/2019 | Rozen | ............ | G01C 21/343 |
| 2019/0101401 A1* | 4/2019 | Balva | ............ | G06Q 50/30 |
| 2019/0197439 A1* | 6/2019 | Ma | | |
| 2019/0325376 A1* | 10/2019 | Khasis | ............ | G06Q 10/083 |
| 2019/0385121 A1* | 12/2019 | Waliany | ............ | G06F 9/54 |
| 2021/0020038 A1* | 1/2021 | Weldemariam | ............ | G08G 1/0112 |
| 2021/0095979 A1* | 4/2021 | Weinstein | ............ | G01C 21/3453 |
| 2021/0304098 A1* | 9/2021 | Yang | ............ | G06Q 10/10 |
| 2021/0356279 A1* | 11/2021 | Szigeti | ............ | G01C 21/3407 |
| 2022/0204050 A1* | 6/2022 | Taveira | ............ | G01C 21/3415 |
| 2022/0276066 A1* | 9/2022 | Beaurepaire | ............ | G01C 21/3492 |
| 2023/0168092 A1* | 6/2023 | Roherty | ............ | G01C 21/3617 701/465 |

* cited by examiner

METHOD, COMPUTER PROGRAM, AND DEVICE FOR CONTROLLING A ROUTE

FIELD

Embodiments relate to a method, a computer program and a device for controlling a route connecting a plurality of destinations in a road network.

BACKGROUND

One of major tasks for modern navigation systems is planning of smart trips. This planning of smart trips may be provided by a smart trip planning service. The smart trip planning service may help a driver to optimize and manage a (mobility) agenda that drives to different destinations for a given time period. Smart trip planning service helps driver to plan and manage the (mobility) agenda being able to maximize the task efficiency including time critical appointments, while minimizing the driving effort, as well as improving the user experience.

The technical problem to solve for a smart trip planning service is in theory, given a list of locations and the distances between each pair of locations, What is the shortest route that visits each location once and returns to the origin location? This is called traveling salesman problem (TSP) that is a non-deterministic polynomial-time (NP)-hard problem having very high computational complexity when number of locations becomes large.

Former work deals with the low complexity scalable constraint optimization algorithm framework as core enabler for Optimization as a Service (OaaS). The Optimization as a Service is described in the U.S. patent application Ser. No. 16/937,610. The algorithm is able to run a few milliseconds per request, and capable of supporting a large number of requests.

SUMMARY

In the smart trip planning service, requirement is very demanding, e.g., picking something or someone up at a given time, scheduled meeting for a given time period, traffic and driving change along the time, agenda update, etc. They all relate the time and its dynamic change. This is a problem addressed in this application. There may be a need for smart trip planning service with a faster (nearly realtime) time processing of large request, utilizing e.g., a low complexity algorithm dealing with real life use cases, such as time critical trip planning with dynamic traffic change. Similar, there may be a need to provide a smart trip planning service with nearly real time processing of a large request utilizing e.g., a low complexity algorithm dealing with real life use cases, such as time critical trip planning with dynamic traffic change. Real life application may be expected to cover time-critical event, e.g. appointment for a given time, meeting at business hour, scheduled parking, while having shortest travel time. Optimization may change along the time, due to the traffic change, agenda update, weather impact, etc. An embodiment may show the measure of change as reference implementation that is used to decide if an optimization needs to execute for the remaining of destinations when exceeding the threshold, thus possible reschedule the trip plan.

The method for smart trip planning service revealed in this application may improve the user experience by proactive reminder in an app, auto navigation and refueling/charging in the driving, saving the time, cost and reduce the traffic. Also, the smart trip planning service may interact the user in cyber-physical space, thus it may further leverage the online-offline ecosystem to seamlessly integrate information of the method may comprises information such as parking, refueling, charging, dealership service, restaurant, etc., due to rich information on (mobility) agenda managed by smart trip planning service. Furthermore, the method leverages the algorithm for OaaS that is able to support scalable and low complexity, particularly for time-windows constraint optimization.

For a given mobility tasks with optional time constraint, the method for smart trip planning service is able to plan a trip having the shortest driving distance and/or time and/or lowest cost. For a given planned trips, it can also estimate the power consumption and "insert" the refueling or charging service as part of trip planning. For each of planned next destination, the proposed smart trip planning service may be able to schedule the time-to-leave feature to remind a user. When a user starts to drive, the navigation may be automatically setup by the service. For each of upcoming destination, it can help user to schedule the parking online as it can have a good, estimated time of arrival and destination. If charging is needed, it can also find the parking having charging facility and reserve it in advance. For mobility planning, user can optionally setup the wish-list at some of destinations, then recommendation can be used based on user profile, e.g., restaurant, shopping, etc. By end of trip, it can summarize what saving and values the service has achieved, and system is able to update user profile for improvement. Further, innovation and opportunity from the ecosystem: since the trips have been well scheduled, thus driving (mobility) agenda and intent are organized online, so it can mash up with partnerships by subscription, notification, recommendation, etc., with broader partnership, thus open the way toward new business model that has already been commonly and actively used in the internet businesses. This will improve user driving experience leveraging more resources and create new monetization opportunities.

The smart trip planning service revealed in this application may support use cases exemplified as the following:

Picking something or someone up at a given time.

Scheduling a meeting for a given time period.

Updating a plan due to dynamic changes in traffic.

Adding a stop for refueling or charging due to a changed driving range.

Updating a (mobility) agenda. In other words, leveraging OaaS.

An optimized (mobility) agenda in the morning may not be the same as in the afternoon. Therefore, there may be a need to detect a change of context and update the (mobility) agenda. If the change is significant, there may be a need to re-run the optimization for a remaining of (mobility) agenda (i.e. optimization process). Otherwise, a user may still follow the same order of (mobility) agenda but may need to adjust the time schedule (i.e., validation process).

A computer-implemented method for controlling a route connecting a plurality of destinations in a road network, comprising:

a. receiving input information, which comprises information about a situation with impact on the route;

b. recalculating a plurality of travel times between the plurality of destinations of the route, based on the received input information and distances between the plurality of destinations; and c. providing output information about the recalculation, which comprises information about a dynamic change of the route.

An embodiment may further comprise detecting a significance of the dynamic change, classifying the significance, and deciding if it needs to recalculate for improving the route.

The recalculation may comprise a rerun for optimizing the route. The recalculation may comprise an adjustment for improving of the route.

The dynamic change may be determined by a matrix of context changes of the plurality of travel times between the plurality of destinations of the route. The matrix of context changes may be derived from at least two different travel duration matrices, which were determined for at least two different times. Furthermore, the matrix of context change may be transformed by a principal component analysis.

An embodiment may further comprise a feature extraction, e.g., transforming the matrix of change by a principal component analysis.

In an embodiment the dynamic change may be determined by a function of change detection, wherein the function of change detection depends on a matrix of context change.

The value of the function of change detection may be compared with a first threshold. If the value of the function of change detection is greater than the first threshold the route may be optimized by recalculating the route.

The rerun may comprise a calculation of one or more parameters of the group of a remaining (mobility) agenda, an included time schedule, a stop for refueling, a stop for charging, a destination sequence and a time window constraint.

The value of the function of change detection may be compared with a first threshold and a second threshold, which is lower than the first threshold. If the value of the function of change detection lies between the first threshold and the second threshold the route may be improved by recalculating the route, wherein a destination sequence is kept unchanged.

In an embodiment a change detection can be triggered by a user's request for update and/or automatically at a scheduled time for a next trip.

The output information may further comprise a signal for a user, which indicates the necessity of rerunning a calculation of the route.

An embodiment may provide a computer program product comprising a computer readable storage medium having program instructions embodied therewith, the program instructions executable by a device to cause the device to:

a. receive input information, which comprises information about a situation with impact on the route;

b. recalculate a plurality of travel times between the plurality of destinations of the route, based on the received input information and distances between the plurality of destinations; and c. provide output information on the recalculation of the route, which comprises information about a dynamic change of the route.

An embodiment may provide a device comprising a memory and at least one processor operably coupled to the memory and configured to perform the above-mentioned method. An embodiment may comprise a vehicle comprising the above-mentioned device.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
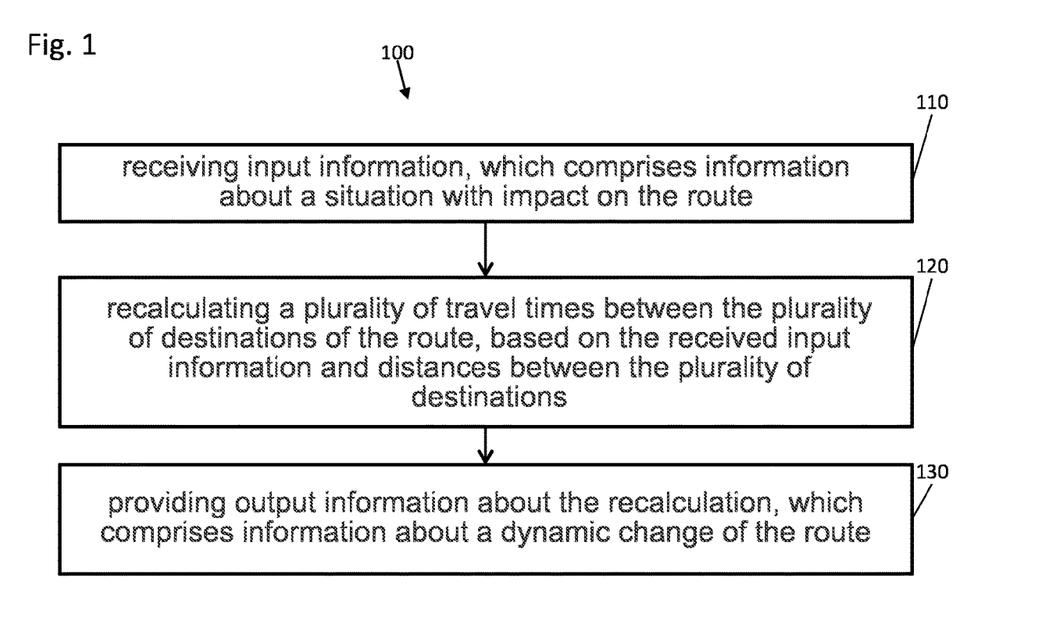
FIG. 1 shows a block diagram of a flow chart of an embodiment of a method 100 controlling a route connecting a plurality of destinations in a road network.

FIG. 1 shows a block diagram of a flow chart of an embodiment of a method 100 controlling a route (also named as original route) connecting a plurality of destinations in a road network. The method 100 comprises receiving 110 input information, which comprises information about a situation with impact on the route. The method 100 further comprises recalculating 120 a plurality of travel times between the plurality of destinations of the route, based on the received input information and distances between the plurality of destinations. The method 100 further comprises providing 130 output information about the recalculation, which comprises information about a dynamic change of the route.

The route may comprise a (mobility) agenda. The (mobility) agenda may comprise (a) time constraint(s) for (a)

destination(s). The (mobility) agenda may comprise a destination, that is not included in a destination sequence, and is rather included in the destination sequence during the usage of the (mobility) agenda depending on free time. For example, a user may want to stop by at a grocery, so this destination may be planned according to actual traffic and/or a remaining time to finish the (mobility) agenda. Similar, a change of the route may be given by a change of the (mobility) agenda.

The situation with impact on the original route may be a situation, which causes a change of a time schedule of the original route, e.g., a traffic jam, a closure of a street, an accident, etc., resulting in an increase of time and/or distance. A change of the time schedule may be caused by a change of a destination of the original route, e.g., an omission of a destination and/or an adding of a destination (herewith also a change of an address of a destination is intended). A change of the time schedule may be caused by an omission of a limiting fact. For example, a closure of a street, which was given at a time for calculating the original route, may be lifted, so that the original route may be improved by replacement with an optimized route, resulting in a reduction of time and/or distance.

Similar, a situation with impact on the original route may be a situation with direct impact on the original route and/or indirect impact on the original route. Direct impact may be given e.g., for a closure of a street of the original route, so that the original route is no longer usable and/or for an omission of a destination. Indirect impact may be given e.g., for lifting a closure of a street, which may be a shortest connection between two destinations. Thus, the original route may be still usable, but an optimized route with a shorter distance may be available. Indirect impact may be given e.g., for an adding of a destination. So, the original route may be still usable, but may not visit all desired destinations in a beneficial order.

The recalculating 120 may be done with the input information and a dataset used for the original route. So, the dataset used for calculating the original route may be improved by the input information. Therefore, the recalculation may provide an updated plurality of travel times, because of the input information. By comparison of the updated pluralities of travel times with the original plurality of travel times a dynamic change of the original route may be determined.

The dynamic change may be a temporal change of the original route, so a dynamic change may be considered as every change leading to a change of a time schedule and/or the shortest (or close to shortest) driving distance.

The dynamic change of the original route may depend only on a plurality of travel times used for calculating the original route. Thus, a change of a travel time, which was only considered for calculating the original route but is not included in the original route, may result in no dynamic change of the original route. Similar, a dynamic change may only be caused by a situation with direct impact.

Optionally or alternatively, a change of a travel time, which was only considered for calculating the original route but is not included in the original route, may result in a dynamic change of the original route. Similar, a dynamic change may also be caused by a situation with indirect impact.

Optionally or alternatively, a change of the destinations and/or a change of a destinations sequence may be a dynamic change. In this case, the total number of destinations may be changed, e.g., by adding and/or removing a destination, so the original travel times may be unchanged.

In fact, there may be a need to consider different travel times for the changed destinations, resulting in a need for optimized travel times.

An embodiment may further comprise detecting a significance of the dynamic change, classifying the significance and deciding if it needs to recalculate for improving the route. The significance of the dynamic change may depend on a predefined value. For example, an increase and/or decrease of 10% and/or 20% etc. of a travel time between two destinations, which belongs to the original route, may be significant. The significance of the dynamic change may depend on a predefined event, e.g., a time constraint for a departure at a destination may be not fulfilled and/or a destination may be replaced/updated leading to a significant dynamic change. If no dynamic change may be detected, a route may be kept unchanged.

In an embodiment the recalculation may comprise a rerun for optimizing the route. The rerun for optimizing the route may comprise a recalculation of all possible routes, e.g., the rerun for optimizing may be done by the same algorithm as the calculation of the original route. Therefore, the optimized route may provide a shortest driving time/distance, which may lead to a beneficial improved user experience.

In an embodiment the recalculation may comprise an adjustment for improving of the route. The adjustment of the route may comprise a recalculation of the destination sequence and/or time constraints for the destination sequence. The adjustment may be done by a lightweight computation; thus, a computational energy/time consumption may be beneficial reduced by the adjustment in comparison to the rerun.

By rerunning a calculation of the (original) route the original route may be optimized by updating and/or replacing. An optimized route may have a shortest route and/or a shorter distance as the original route. Thus, a user experience may be improved by the optimized route, due to time and/or money savings.

In an embodiment the dynamic change may be determined by a matrix of context changes of the plurality of travel times between the plurality of destinations of the route. Thus, the significance of the dynamic change may be detected in dependency of the matrix of context changes. The plurality of travel times between the plurality of destinations of the route may be changed by a situation with impact on the route, e.g., a change of a traffic, a weather, the (mobility) agenda and/or a contextual event such as refueling, charging, etc.

For TSP, a model on the distance matrix, which is time-invariant, can be applied. If a velocity V is constant, a distance D and a time T performs the same way. A difference is just a matter of scaling of V. This leads to:

$$T_{A,B}(t_0) = \frac{D_{AB}}{V_{AB(t_0)}},$$

where $T_{AB}(t_0)$ is an average travel duration when running optimization at time $t_0$.

For TSP-TW for shortest driving duration, model is constrained by time, so it needs to apply in time-variant model, rather static model from distance matrix. If V is time-variant, a temporal rather spatial or distance space may be applied. This leads to:

$$T_{A,B}(t) = \frac{D_{AB}}{V_{AB(t)}} = \frac{V_{AB(t_0)} \cdot D_{AB}}{V_{AB(t)} \cdot V_{AB(t_0)}} = \lambda_{AB}(t, t_0) \cdot T_{AB(t_0)}, \text{with}$$

$$\lambda_{AB}(t, t_0) = \frac{V_{AB(t_0)}}{V_{AB(t)}}.$$

Here, A and B are two different destinations, $t_o$ is the time for the calculation of the travel times of the original route and t is the time for the recalculation of the optimized travel times. With $\lambda_{AB}$ the change against the duration at $t_0$ can be tracked. If a change is significant, it may need to rerun the optimization for the remaining part of journey or (mobility) agenda.

In an embodiment the matrix of context changes may be derived from at least two different travel duration matrices, which were determined for at least two different times.

A travel duration matrix $\vec{T}(t_0)$ at a previous time $t_0$, which may be used for calculating the original route, may be given by:

$$\vec{T}(t_0) = \begin{pmatrix} T_{11}(t_0) & \cdots & T_{1N}(t_0) \\ \vdots & \ddots & \vdots \\ T_{N1}(t_0) & \cdots & T_{NN}(t_0) \end{pmatrix},$$

where N is the total number of destinations. A travel duration matrix $\vec{T}(t)$ at a current time t, which may be used for recalculating the optimized route, may be given by:

$$\vec{T}(t) = \begin{pmatrix} T_{11}(t) & \cdots & T_{1N}(t) \\ \vdots & \ddots & \vdots \\ T_{N1}(t) & \cdots & T_{NN}(t) \end{pmatrix}.$$

Using these matrices, the matrix of context change $\vec{\lambda}(t, t_0)$s may be given by a quotient $$\vec{\lambda}(t, t_0) = \frac{\vec{T}(t_0)}{\vec{T}(t)}$$

following to:

$$\vec{\lambda}(t, t_0) = \begin{pmatrix} \lambda_{11}(t) & \cdots & \lambda_{1N}(t) \\ \vdots & \ddots & \vdots \\ \lambda_{N1}(t) & \cdots & \lambda_{NN}(t) \end{pmatrix}.$$

Figure 2:
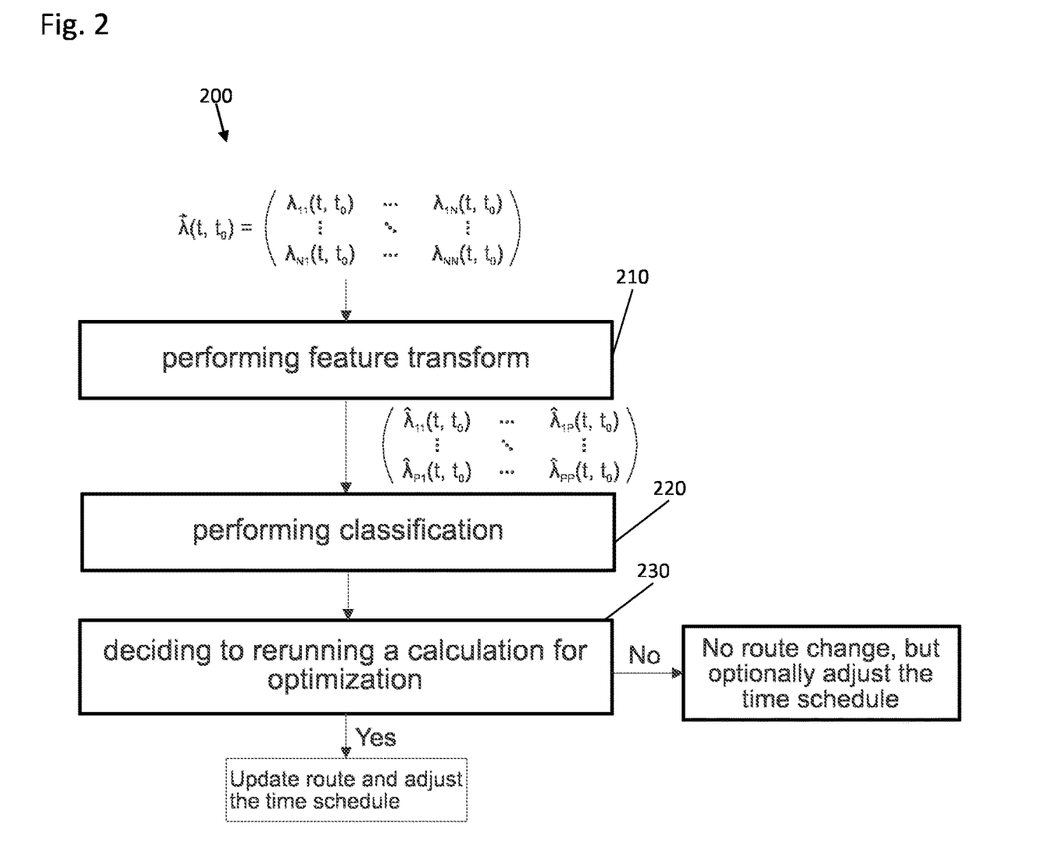
FIG. 2 shows a block diagram of a flow chart of an embodiment of a method for controlling a route connecting a plurality of destinations in a road network.

An embodiment may further comprise a feature extraction, e.g., the matrix of context change may be transformed by a principal component analysis (see also FIG. 2). A feature transformed matrix $\vec{\hat{\lambda}}(t, t_0)$, e.g., transformed by principal component analyses, may be given by:

$$\vec{\hat{\lambda}}(t, t_0) = \begin{pmatrix} \hat{\lambda}_{11}(t) & \cdots & \hat{\lambda}_{1P}(t) \\ \vdots & \ddots & \vdots \\ \hat{\lambda}_{P1}(t) & \cdots & \hat{\lambda}_{PP}(t) \end{pmatrix},$$

where P is a reduced number of destinations; P<N.

In an embodiment the dynamic change may be determined by a function of change detection, wherein the function of change detection depends on a matrix of context change, e.g., a travel duration. The function of change detection $m(t, t_0)$ may be given by:

$$m(t, t_0) = \frac{\sum_{i=1}^{N} \sum_{j=1}^{n} (\lambda_{ij}(t, t_0) - \hat{\lambda}(t, t_0))^2}{N^2 - 1},$$

where i and j are the index for the ith and jth destination, respectively and $\vec{\lambda}$ is the mean. With the function of change detection, a change at a time t may be measured.

In an embodiment a value of the function of change detection may be compared with a first threshold and if the value of the function of change detection is greater than the first threshold the route may be optimized by recalculating the route. The recalculating of the route may comprise a recalculating of a route planning. The recalculating of the route may comprise a rerun for optimizing the route with all possible routes as described above. Thus, a computational power and/or an energy consumption may be beneficial reduced by using the first threshold. For example, an energy consumption for calculating purposes may be desirable decreased, because a recalculation is only performed for a significant change, e.g., an increase of time of 10% and or 20% of the original route time.

In an embodiment a rerun may comprise a calculation of one or more parameters of the group of a remaining (mobility) agenda, an included time schedule, a stop for refueling, a stop for charging, a destination sequence and a time window constraint. Thus, a computational power and/or an energy consumption for recalculation may be decreased by choosing the desired parameter for the rerun. For example, a user may want to refuel the car regardless of a current fill level, because a long trip may be planned for the day after. So, the input information may comprise the information, that a refill is desired, an additional destination may be added and the rerun to obtain an optimized route may be focused on this additional destination.

In an embodiment a value of the function of change detection may be compared with a first threshold and a second threshold, which is lower than the first threshold. If the value of the function of change detection lies between the first threshold and the second threshold the route may be improved by recalculating the route, wherein a destination sequence is kept unchanged. The recalculation of the route may comprise an adjustment of the route as described above, e.g., the recalculation may be performed by a lightweight algorithm to just adjust e.g., a time schedule and/or a time constraint of a destination. Thus, a computational power and/or an energy consumption may be beneficial reduced by using the first and second threshold, e.g., by keeping the destination sequence constant.

In an embodiment a change detection may be triggered by a user's request for update and/or automatically at a scheduled time for a next trip. The change detection may be related to the input information, e.g., the change detection may be initiated by a received input information. For example, the input information may be a request of the user to refill the vehicle today. Thus, a change in the (mobility) agenda may be detected, caused by the input information provided by the user. This may lead to a recalculation of the route, comprising a rerun or an adjustment of the original route. For example, the input information may be an automatically received signal, e.g., a radio signal, which comprises traffic information and/or map information. For example, the input information may be a signal depending on a time, e.g., the departure for a planed destination. If a departure time is extended, the input information may comprise information about this delay. Thus, the input information/change detection may be beneficial linked to an occurring dynamic change of the original route.

In an embodiment the output information may further comprise a signal for a user, which indicates the necessity of rerunning a calculation of the (original) route. Thus, a user may decide if a rerun is desired, which may beneficially improve the user experience.

In an embodiment the output information may further comprise information for the user on the trip, e.g., possible arrival at a destination, need to depart from actual destination etc.

More details and aspects are mentioned in connection with the embodiments described below. The example shown in FIG. 1 may comprise one or more optional additional features corresponding to one or more aspects mentioned in connection with the proposed concept or one or more examples described below (e.g., FIG. 2-5).

FIG. 2 shows a block diagram of a flow chart of an embodiment of a method for controlling a route connecting a plurality of destinations in a road network. The method 200 comprises performing a feature transform 210, performing 220 a classification and deciding 230 to rerun a recalculation for optimization.

A matrix of context changes $\vec{\lambda}(t, t_0)$ may be feature transformed e.g., by principal component analysis, resulting in a feature transformed matrix $\vec{\lambda}(t, t_0)$. This featured transformed matrix may provide a reduced information depth, which may be achieved by deleting unnecessary elements of the matrix of context changes. Thus, further method steps may be beneficial improved by the reduced information depth, resulting in a faster and/or resource saving calculation. A classifier used for performing 220 a classification may detect a significance of a (dynamic) change, e.g., a temporal change. The classifier can be a supervised trained simple model, where data can be easily obtained. It then can be applied in real time processing.

Deciding 230 to rerun may focus on the likelihood for an optimization caused by the rerun. The decision may be based on first threshold and/or second threshold. So, either a decision may be made, that a rerun for optimization is not necessary and the original route is not change and optionally the time schedule may be adjusted. Or a decision may be made that a rerun for optimization is necessary and the original route may be updated/optimized and the time schedule may be adjusted.

For a given travel duration matrix, a rerun may be performed for optimization of each duration change that may change the final result. It can regularize it by principal component analysis and then it can train the classifier if it needs to rerun the optimization. It can also simply optimize the first and/or second threshold that best classifies the results between change and no-change.

More details and aspects are mentioned in connection with the embodiments described above and/or below. The example shown in FIG. 2 may comprise one or more optional additional features corresponding to one or more aspects mentioned in connection with the proposed concept or one or more examples described above (e.g., FIG. 1) and/or below (e.g., FIG. 3a-5).

Figure 3A:
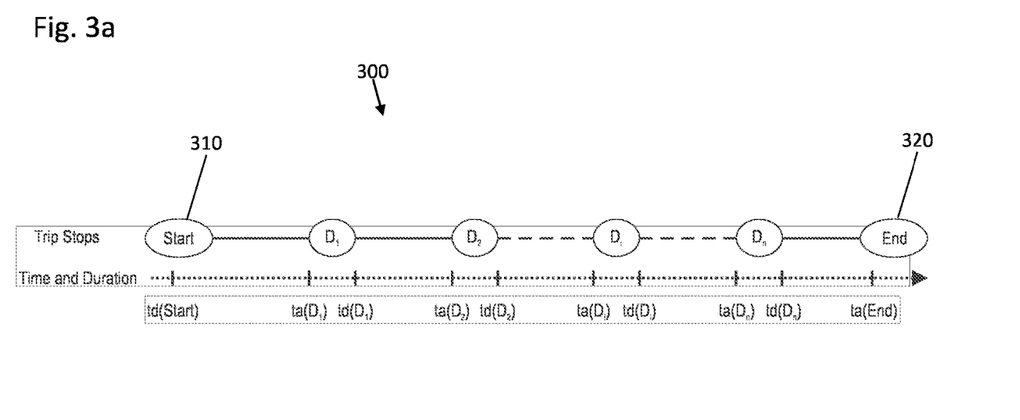
FIG. 3a shows a flow chart of a trip/route planed using an embodiment of the method.

FIG. 3a shows a flow chart of a trip/route planed using an embodiment of the method. The method 300 shows the usage of a smart optimal trip planning service. For example, a user may plan to drive to several destinations $D_1$, $D_2, \ldots, D_i, \ldots, D_N$. A start 310 of the trip may be a home of the user. A first destination Di may be an office for meeting at 9-11am. A second destination $D_2$ may be a restaurant to meet friends at 12-1:30pm. A further stop may be visiting a customer at office during 2:30-4pm and a further stop may be to pick up a kid from school at 5pm. Additionally, a further stop may be at a grocery story for shopping and to pick up a package at a post office. Additionally, a further constraint may be a promise of the user to be back home (reaching the end 320) for dinner around 6-7pm. At least on of the destinations may be assigned to a time constraint. In FIG. 3 every destination may be assigned to a time constraint, wherein the start 310 and the end 320 may be assigned to a fixed time td(Start) and ta(End), respectively and the other destinations may be assigned to a time window constraint (ta is an arrival time at the destination $D_i$, td is a departure time at the destination $D_i$).

The smart trip planning service may run an optimization for a given (mobility) agenda to enable features, e.g.:

Validation: if it is an infeasible (mobility) agenda, the service may suggest rescheduling or dropping out some of tasks.

Optimization: if it is a valid (mobility) agenda, the service may optimize the (mobility) agenda and may predict a refueling or charging as a part of the (mobility) agenda.

Upon a user's confirmation, the service may have the (mobility) agenda shown in FIG. 3. It can remind the user "time-to-leave" right before the next trip in an app and setup the navigation when the user comes to the vehicle, and warn the user if the remaining (mobility) agenda is getting tight, so the user is aware of this situation, either drive a bit faster or keep others informed if needed.

The service can refresh the optimization right before the next trip, so it can make a proper adjust if the context, such as traffic has significantly changed since the original calculation of the (mobility) agenda.

Since refueling or charging is created and "inserted" by the service, a driver can refuel or charge the car with the least effort.

More details and aspects are mentioned in connection with the embodiments described above and/or below. The example shown in FIG. 3a may comprise one or more optional additional features corresponding to one or more aspects mentioned in connection with the proposed concept or one or more examples described above (e.g., FIG. 1-2) and/or below (e.g., FIG. 3b-5).

Figure 3B:
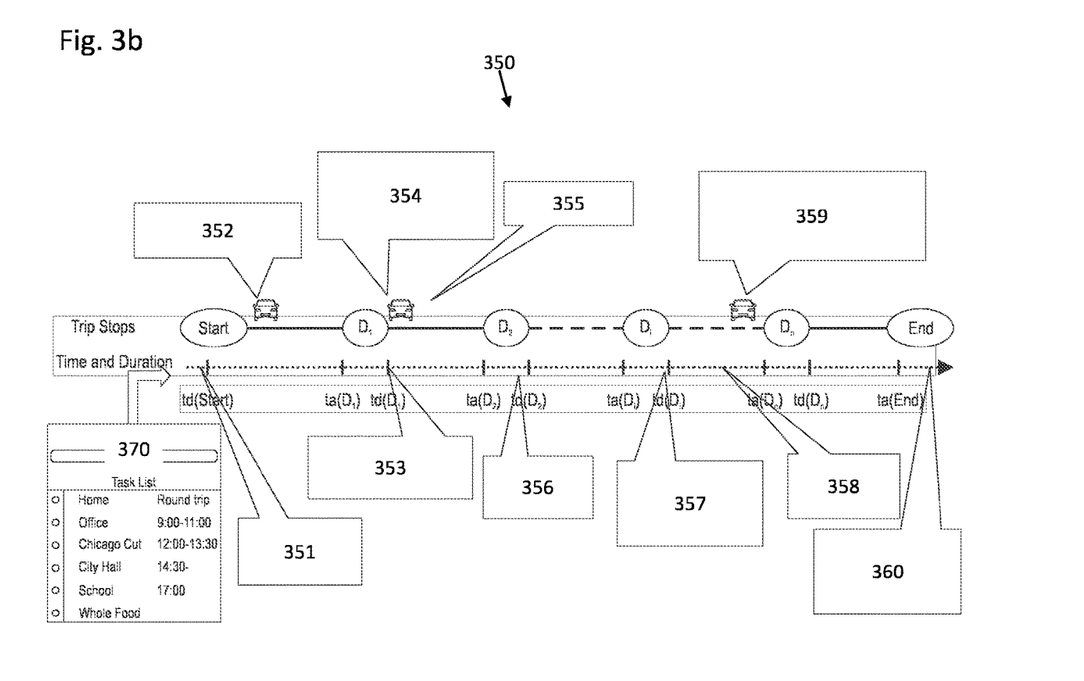
FIG. 3b shows a flow chart of a trip/route planed using an embodiment of the method.

FIG. 3b shows a flow chart of a trip/route planed using an embodiment of the method. The method 350 shows the usage of a smart optimal trip planning service of FIG. 3a in further details. For example, a user may plan to drive to several destinations $D_1, D_2, \ldots, D_i, \ldots, D_N$. A start 310 of the trip may be a home of the user. A first destination $D_1$ may be an office for meeting at 9-11am. A second destination $D_2$ may be a restaurant to meet friends at 12-1:30pm. A further stop may be visit at a city hall at 2:30pm and a further stop may be to pick up a kid from school at 5pm. Additionally, a further stop may be at a grocery story for shopping. Additionally, a further constraint may be a promise of the user to be back home (reaching the end 320) for dinner around 6-7pm. At least on of the destinations may be assigned to a time constraint. In FIG. 3 every destination may be assigned to a time constraint, wherein the start 310 and the end 320 may be assigned to a fixed time td(Start) and ta(End), respectively and the other destinations may be assigned to a time window constraint (ta is an arrival time at the destination $D_i$, td is a departure time at the destination $D_i$).

The smart trip planning service may be provided by an app 370 and the app 370 may comprise a task list with the destinations: home (round trip), office Chicago cut, city hall, school and whole food. The destination may be fixed due to time windows constraints except of the destination whole food. The system may send a message 351 to the user briefly (may be set by a user, obtained by experiences and/or set to fixed value) before the user has to leave, that the user may has to leave home at 7am and may inform the user about the (mobility) agenda of today. A second message 352 may be send to the user, informing the user that the traffic is as same as usual and the user will arrive at destination $D_1$ at a planed time. A third message 353 may be send to the user, informing the user that he may have to leave now (at $td(D_1)$) to meet a friend at Chicago Cut Restaurant due to traffic.

A fourth message 354 may be send to the user, informing the that the navigation is set for the next destination and suggesting booking a parking place (with charging). So, the user experience may be beneficial improved, because during driving the system may book a parking place for the next destination. A fifth message 355 may be send to the user, asking the user if he has anything for the next destination, e.g., a coupon for the meal. A sixth message 356 may be send to the user, informing to leave now for whole food and that one hour is left for shopping if the user leaves now. A seventh message 357 may be send to the user, informing to leave now to pickup a kid at school.

An eight message 358 may be send to the user, informing to drive a bit faster due to a tight schedule, suggesting a maximal driving time and optionally suggesting informing the kid by a message that the user is late. A ninth message 359 may be send to the user, informing the user about the day trip, and/or summarizing the trip and/or savings.

From a (mobility) agenda, the system may better understand the user's mobility behavior, resulting in engaging the user with mor information.

More details and aspects are mentioned in connection with the embodiments described above and/or below. The example shown in FIG. 3b may comprise one or more optional additional features corresponding to one or more aspects mentioned in connection with the proposed concept or one or more examples described above (e.g., FIG. 1-3a) and/or below (e.g., FIG. 5).

Figure 4:
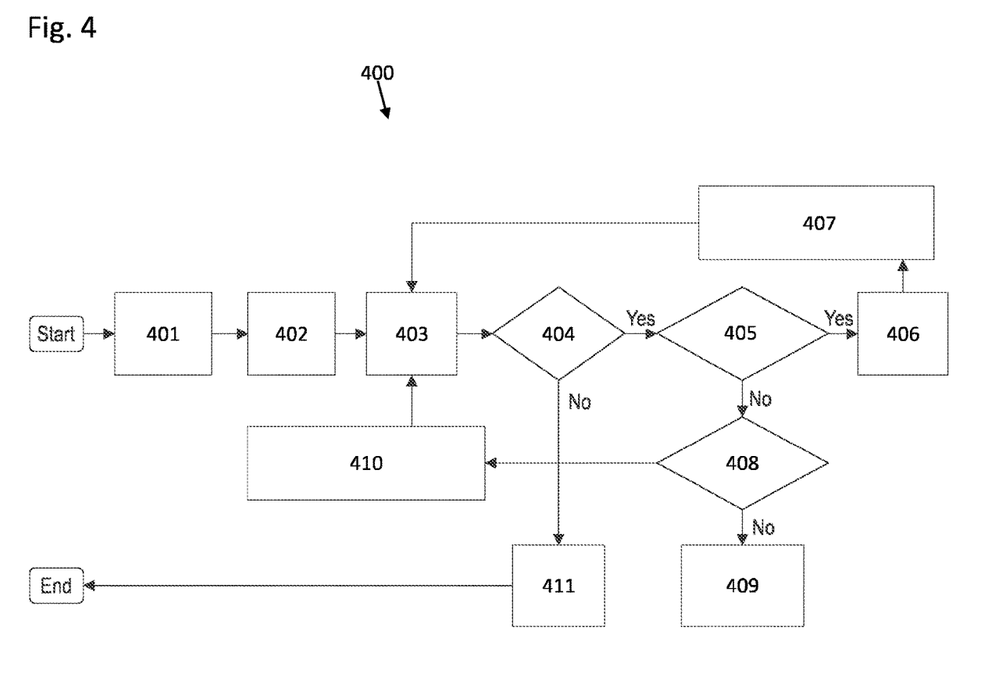
FIG. 4 shows a block diagram of an embodiment of the method.

FIG. 4 shows a block diagram of an embodiment of the method. The method 400 shows a workflow for the method. In step 401 may a (mobility) agenda of the user be extracted. In step 402 may the Optimization as a Service (see ???) be used for calculating an original route. In step 403 may an optimal (mobility) agenda for the use be determined. In step 404 may be detected if a next destination is on the (mobility) agenda. If a next stop is on the (mobility) agenda in step 405 may a significance of a dynamic change be detected. If the dynamic change is significant in step 406 a rerun for of Optimization as a Service may be performed. In step 407 a remaining (mobility) agenda may be optimized including the time schedule and the destination sequence. If the dynamic change is not significant in step 408 may be decided if a time adjustment needed to be validated. If this is not the fact, in step 409 may no update be performed. If a time adjustment is needed, in step 410 a validation to adjust the time schedule may be performed, but the destination sequence may be kept constant. If in step 404 no next trip is detected, in step 411 a summary of the trip may be given.

More details and aspects are mentioned in connection with the embodiments described above and/or below. The example shown in FIG. 4 may comprise one or more optional additional features corresponding to one or more aspects mentioned in connection with the proposed concept or one or more examples described above (e.g., FIG. 1-3b) and/or below (e.g., FIG. 5).

Figure 5:
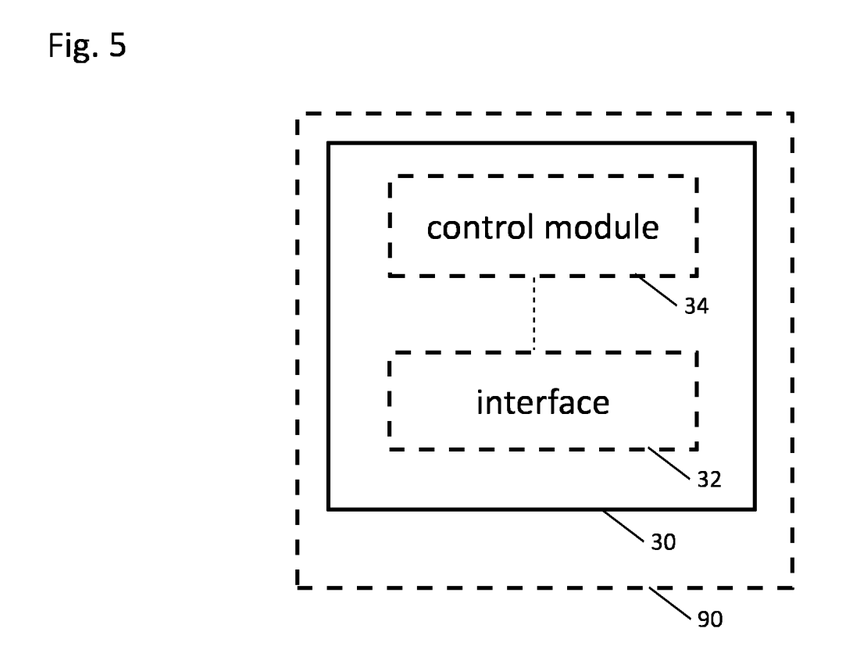
FIG. 5 shows a block diagram of an embodiment of a device.

FIG. 5 shows a block diagram of an embodiment of a device. The device 30 comprises processing circuitry, which is configured to perform the method described herein. For example, the device 30 may comprise one or more interfaces 32, which are coupled to a control module 34. The device 30 may be used in a vehicle 90. The control module 34 controls the one or more interfaces 32 and is configured to perform any of the methods described herein. Another embodiment is a machine-readable medium including code, when executed, to cause a machine to perform the method for training a machine learning module for determining a route connecting a plurality of destinations in a road network.

In embodiments the one or more interfaces 32 may correspond to any means for obtaining, receiving, transmitting or providing analog or digital signals or information, e.g., any connector, contact, pin, register, input port, output port, conductor, lane, etc. which allows providing or obtaining a signal or information. An interface 32 may be configured to communicate, i.e., transmit or receive signals, information with further internal or external components. The one or more interfaces 32 may comprise further components to enable according communication in a (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. In some examples the one or more interfaces 32 may serve the purpose of transmitting or receiving or both, transmitting and receiving, information, such as information, input data, control information, further information messages, etc.

As shown in FIG. 5 the respective one or more interfaces 32 are coupled to the respective control module 34 at the apparatus 30. In embodiments the control module 34 may be implemented using one or more processing units, one or more processing devices, any means for processing, such as a processor, a computer or a programmable hardware component being operable with accordingly adapted software. Similar, the described functions of the control module 34 may as well be implemented in software, which is then executed on one or more programmable hardware components. Such hardware components may comprise a general-purpose processor, a Digital Signal Processor (DSP), a micro-controller, etc.

In an embodiment the device 30 may comprise a memory and at least one processor 34 operably coupled to the memory and configured to perform the above-mentioned method.

More details and aspects are mentioned in connection with the embodiments described above. The example shown in FIG. 5 may comprise one or more optional additional features corresponding to one or more aspects mentioned in connection with the proposed concept or one or more examples described above (e.g., FIG. 1-4).

The method shown above may improve a driving productivity and efficiency and/or help driver to optimally manage the (mobility) agenda being able to maximize the task completion for improved productivity, meanwhile minimize the driving effort for improved driving efficiency. A smart driving experience, caused by improving holistic driving experience by reminder in the app, auto navigation and refueling/charging in the driving may beneficially save time and cost. A traffic, pollution and energy consumption may be beneficial reduced, due to shortest distance and/or time travelled. Since the trips may have been well scheduled, thus (mobility) agenda and intent may be organized online, so it can mash up with partnerships by subscription, notification, recommendation, etc., with broader partnership, thus may open the way toward new business model commonly and actively used in the internet businesses. This will improve user driving experience leveraging more resources and create new monetization opportunities.

Further, a method for determining a route connecting a plurality of destinations in a road network may comprise receiving input information, which comprises information on distances between the plurality of destinations in the road network, inputting the input information on the distances into a trained machine learning module and providing output information on the route connecting the plurality of destinations based on an output of the trained machine learning module.

As has been described in the U.S. patent application Ser. No. 16/937,610 the OaaS may be used to determine the shortest driving duration as optimization objective, while meeting time-window constraints. The model input parameter in this case may be a trip duration $t_{ij}$ and a time window for node $(s_i, e_i)$, wherein the training objective is the shortest driving duration. Input feature to embedding layer change to $x_i = \{t_{i,0}, t_{i,1} \ldots t_{i,N}, s_i, e_i\}$ with $i=1 \ldots N$, where $t_{ij}$ means travel time between location i and j. Suppose the location travel sequence in $\pi$ is $\pi_0, \pi_1, \ldots \pi_N$, the total travel time is $\Sigma_{k=0}^{N-1} t_{\pi_k \pi_{k+1}}$.

A reward function in an embodiment can be defined as:
$R(\pi|s) = L(\pi|s)$.

Here s is the state, the input question to be solved; $\pi$ is the solution agent given. $L(\pi|s)$ is the cost function given $s, \pi$, it shows how good the $\pi$ is given s. For TSP problem, cost function equals to route length of solution $\pi$. For TSPTW, the target was shortest travel distance or time and visiting each location during time-window. Here cost function could be defined as total travel time plus delay penalty, it can be calculated as:

For cost function L suppose the location sequence in $\pi$ is $\pi_1, \pi_2, \ldots \pi_N$:
Penalty=0
For k=0 to N−1
$t(\pi_{k+1}) = t(\pi_k) + t_{\pi_k \pi di\ k+1}$, if $t(\pi_{k+1}) < s_{\pi_{k+1}}$: $t(\pi_{k+1}) = s_{\pi_{k+1}}$
If $t(\pi_{k+1}) > e_{\pi_{k+1}}$: Penalty+=$(e_{\pi_{k+1}} - t(\pi_{k+1}))$
$t(\pi_{k+1}) = t(\pi_k) + t_{\pi_k} si\ \pi_{k+1}$
$L(\pi) = W * Penalty + t(\pi_N)$
W is the weight.

An alternative may be a shortest driving distance as training objective. The shortest driving distance may be beneficially for reducing emission. The model input parameter in this case may be a trip duration $t_{ij}$, a trip distance $d_{ij}$ and a time window for node $(s_i, e_i)$. A model architecture is the same as in the U.S. patent application Ser. No. 16/937,610, that is optimized for shortest driving time. The model may be modified for the training objective shortest driving distance as shown below.

Input feature to embedding layer change to $x_i = \{d_{i,0}, d_{i,1} \ldots, d_{i,N}, t_{i,0}, t_{i,1}, \ldots, t_{i,N}, s_i, e_i\}$ $i=1 \ldots N$, here $d_{i,k}$ means distance between location i and j, $t_{i,k}$ means travel time between location i and j. Suppose the location travel sequence in $\pi \pi_0, \pi_1, \ldots \pi_N$, the total travel distance is $\Sigma_{k=0}^{N} d_{\pi_k \pi_{k+1}}$.

For cost function L suppose the location sequence in $\pi$ is $\pi_1, \pi_2, \ldots \pi_N$:
Penalty =0
For k=0 to N−1
$t(\pi_{k+1}) = t(t\pi_k) + t_{\pi di\ k^\pi k+1}) < s_{\pi_{k+1}}$: $t(\pi_{k+1}) = s_{\pi_{k+1}}$
If $t(\pi_{k+1}) > e_{\pi di\ k+1}$: Penalty+=$(e_{\pi di\ k+1} - t(\pi k_{k+1}))$
$d(\pi_{k+1}) = d(\pi_k) + d_{\pi_k \pi_{k+1}}$
$L(\pi) = W * Penalty + d(\pi_N)$
W is the weight.

With this input parameter a shortest driving distance can be calculated. Thus, a traffic and an energy consumption may be beneficial reduced.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A computer-implemented method for a navigation system of a vehicle connected to a transceiver, wherein the system controls a route connecting a plurality of destinations in a road network, the method comprising:
constructing the route comprising a time schedule and a destination sequence, the time schedule initially constructed at an original time by calculating an original plurality of travel times between the plurality of destinations, based on time constraints for the plurality of destinations and distances between the plurality of destinations;
receiving input information at an input time via the transceiver, which comprises map and traffic information about a situation with impact on the time schedule or the destination sequence of the route;
recalculating an updated plurality of travel times between the plurality of destinations of the destination sequence of the route, based on the received input information and distances between the plurality of destinations;
determining a dynamic change to the route,
wherein the dynamic change is determined by a function of change detection, wherein the function of change detection depends on a matrix of context change is derived from the original and the updated plurality of travel times between the plurality of destinations of the route; and
wherein the matrix of context changes is derived from a first travel duration matrix determined at the original time and a second travel duration matrix determined at the input time;
classifying the dynamic change as significant when an at least a first threshold or a second threshold is triggered, wherein the second threshold is lower than the first threshold;
reconstructing the route when the dynamic change is significant, wherein
the route is improved by adjusting the time schedule or the destination sequence when the second threshold is triggered, and
the route is optimized by recalculating the time schedule and the destination sequence when the first threshold is triggered, wherein; and
providing output information about the reconstruction, which comprises information about the dynamic change of the route.

2. The method according to claim 1, wherein reconstructing the route comprises adding a stop for refueling or charging when a driving range is changed.

3. The method according to claim 1, wherein the reconstruction comprises a calculation of one or more parameters of the group of:
a stop for refueling; and
a stop for charging.

4. The method according to claim 1, further comprising feature extraction, wherein the matrix of context changes is transformed by a principal component analysis.

5. The method according to claim 1, further comprising:
comparing a value of the function of change detection, with a first threshold; and
if the value of the function of change detection is greater than the first threshold;
optimizing the route by recalculating the route.

6. The method according to claim 5, wherein the reconstruction comprises a calculation of one or more parameters of the group of:
a stop for refueling; and
a stop for charging.

7. The method according to claim 1, further comprising:
comparing a value of the function of change with the first threshold and the second threshold; and
reconstructing the route when the value of the function of change lies between the first threshold and the second threshold,
wherein a destination sequence is kept unchanged.

8. The method according to claim 1, wherein a change detection can be triggered by a user's request for update or automatically at a scheduled time for a next trip.

9. The method according to claim 1, wherein the output information further comprises a signal for a user, which indicates a necessity of rerunning a calculation of the route.

10. A device comprising:
a transceiver;
a memory; and
at least one processor operably coupled to the memory and the transceiver; and
wherein the device is configured to:
construct a route comprising a time schedule and a destination sequence, the time schedule initially constructed at an original time by calculating an original plurality of travel times between a plurality of destinations, based on time constraints for the plurality of destinations and distances between the plurality of destinations;
receive input information at an input time via the transceiver, which comprises map and traffic information about a situation with impact on the time schedule or the destination sequence of the route;
recalculate an updated plurality of travel times between the plurality of destinations of the destination sequence of the route, based on the received input information and distances between the plurality of destinations;
determine a dynamic change to the route,
wherein the dynamic change is determined by a function of change detection, wherein the function of change detection depends on a matrix of context change is derived from the original and the updated plurality of travel times between the plurality of destinations of the route; and
wherein the matrix of context change is derived from a first travel duration matrix determined at the original time and a second travel duration matrix determined at the input time;

classify the dynamic change as significant when an at least a first threshold or a second threshold is triggered, wherein the second threshold is lower than the first threshold;

reconstruct the route when the dynamic change is significant, wherein the route is improved by adjusting the time schedule or the destination sequence when the second threshold is triggered, and the route is optimized by recalculating the time schedule and the destination sequence when the first threshold is triggered; and provide output information about the reconstruction, which comprises information about the dynamic change of the route.

11. A vehicle comprising a navigation device with a processor and a transceiver, wherein the processor comprises program instructions that, when executed, cause the device to:

construct a route comprising a time schedule and a destination sequence, the time schedule initially constructed at an original time by calculating an original plurality of travel times between a plurality of destinations, based on time constraints for the plurality of destinations and distances between the plurality of destinations;

receive input information at an input time via the transceiver, which comprises map and traffic information about a situation with impact on the time schedule or the destination sequence of the route;

recalculate an updated plurality of travel times between the plurality of destinations of the destination sequence of the route, based on the received input information and distances between the plurality of destinations;

determine a dynamic change to the route, wherein the dynamic change is determined by a function of change detection, wherein the function of change detection depends on a matrix of context change is derived from the original and the updated plurality of travel times between the plurality of destinations of the route; and wherein the matrix of context changes is derived from a first travel duration matrix determined at the original time and a second travel duration matrix determined at the input time;

classify the dynamic change as significant when an at least a first threshold or a second threshold is triggered, wherein the second threshold is lower than the first threshold;

reconstruct the route when the dynamic change is significant, wherein the route is improved by adjusting the time schedule or the destination sequence when the second threshold is triggered, and the route is optimized by recalculating the time schedule and the destination sequence when the first threshold is triggered; and provide output information about the reconstruction, which comprises information about the dynamic change of the route.

* * * * *